(12) United States Patent
Barber

(10) Patent No.: US 7,318,363 B1
(45) Date of Patent: Jan. 15, 2008

(54) APPARATUS AND METHOD FOR ATTACHING A TIRE CHAIN

(76) Inventor: Alan Barber, 412 Cheryl Way, Stagecoach, NV (US) 89429

( * ) Notice: Subject to any disclaimer, the term of this patent is extended or adjusted under 35 U.S.C. 154(b) by 170 days.

(21) Appl. No.: 11/110,561

(22) Filed: Apr. 19, 2005

(51) Int. Cl.
*B60C 27/06* (2006.01)
(52) U.S. Cl. ........................................ 81/15.8
(58) Field of Classification Search ............... 81/15.8; 152/213 R, 213 A, 241–242
See application file for complete search history.

(56) References Cited

U.S. PATENT DOCUMENTS

| | | | | |
|---|---|---|---|---|
| 1,409,025 A | * | 3/1922 | Rawlins | 81/15.8 |
| 1,602,419 A | * | 10/1926 | Staggers et al. | 81/15.8 |
| 2,316,718 A | * | 4/1943 | Royer | 152/213 A |
| 5,020,396 A | * | 6/1991 | Dunn | 81/15.8 |

* cited by examiner

*Primary Examiner*—D. S. Meislin
(74) *Attorney, Agent, or Firm*—Robert S. Smith

(57) ABSTRACT

An apparatus for use in securing a snow chain onto the wheel of a vehicle, including a bar, a pair of cables, each cable having an end secured to one end of the bar opposite another cable having one end secured to an opposite end of said bar, a chain hook attached to a free end of each cable, and a sliding hook slideably positionable on each said cable, an elastic band having one end secured to a location on said bar intermediate between ends of said bar and an anchor hook secured to another end of said elastic band enabling a user to lay said snow chain in front of said wheel, drive said vehicle onto the snow chain, drape said snow chain around and over a top of said wheel, attach each of said chain hooks to an end of a respective one of the side chains of the snow chain, hook each one of the sliding hooks onto the side chain, hook said anchor hook on the elastic band to the opposite end of the snow chain providing that the ends of the snow chain are drawn together and said snow chain is drawn around the wheel, inserting at least one fastener into links selected to join one end of each side chain to the opposite end of the same side chain.

2 Claims, 4 Drawing Sheets

APPARATUS AND METHOD FOR ATTACHING A TIRE CHAIN

FIELD OF THE INVENTION

This invention relates to tire chains and particularly to a device for facilitating attachment of a snow chain to a tire of a vehicle.

BACKGROUND AND INFORMATION DISCLOSURE

A "snow chain" is attached to the tire of an automobile to provide traction between the tire and road when the road is covered with ice or snow. FIG. 2 (prior art) shows the typical "snow chain" 11, stretched out on the ground. There are shown two long lengths of "side" chains 12, side by side and parallel to one another with several short lengths of "linking" chain 14, each linking chain 14 having one end attached to one side chain 12 and another end attached to the other side chain 12 so that the snow chain 16 is a chain ladder.

One such snow chain is typically attached to each one tire, respectively when driving during icy conditions. The snow chain is removed when the ice/snow is gone in order to avoid damage to the tire such as can occur when the vehicle with snow chains is driven over bare concrete. It is therefore a matter of great convenience that the driver be enabled to attach and remove the snow chains easily in unfavorable weather conditions.

"Snow chains" are attached to the tire of an automobile by laying a snow chain in front of each tire and then driving the automobile forward so that each wheel is positioned over a respective snow chain.

Then the driver wraps each snow chain around the respective wheel and fastens the ends of each snow chain together thereby securing the snow chain on the wheel.

This is a most tedious operation since each snow chain tends to "fall off the wheel" unless the snow chain is balanced on the respective wheel very carefully. For this reason, attachment of the snow chain to the wheel is most conveniently accomplished when two people perform the attachment operation—one person holding the ends of the snow chain in position while the other person attaches fasteners that hold the ends of the snow chain together.

Obviously, the job of attaching snow chains is exacerbated when the driver attempts to mount the snow chain by himself.

SUMMARY OF THE INVENTION

It is an object of this invention to provide a device that facilitates the task of attaching an automobile tire chain to the wheel of a vehicle. It is contemplated that the device and method be particularly useful in aiding a driver who is attempting to attach the snow chains by himself.

This invention is directed toward a rigid bar having a cable extending from one end of the bar and another cable extending from the other end of the bar. One cable has one cable hook attached to a free end of the cable and a sliding hook slideably mounted on the cable. The other cable has another cable hook attached to a free end of the other cable and another sliding hook slideably mounted on the other cable. An elastic band has one end secured to the middle of the bar and an anchor hook on the opposite end of the band.

To attach the tire chain to the respective wheel, the vehicle is driven onto the outstretched chain to where one end of the snow chain extends beyond the tire. Then the opposite end of the snow chain is draped over the tire. Each cable hook, on the cable attached to the bar, is hooked onto the end of the respective side chain. The anchor hook on the elastic band is attached to a link at the opposite end of the side chain. The elastic band pulls and holds the ends of the snow chain together around the wheel enabling the driver to insert fasteners in links of each end of the snow chain.

DESCRIPTION OF A PREFERRED EMBODIMENT

Figure 2:
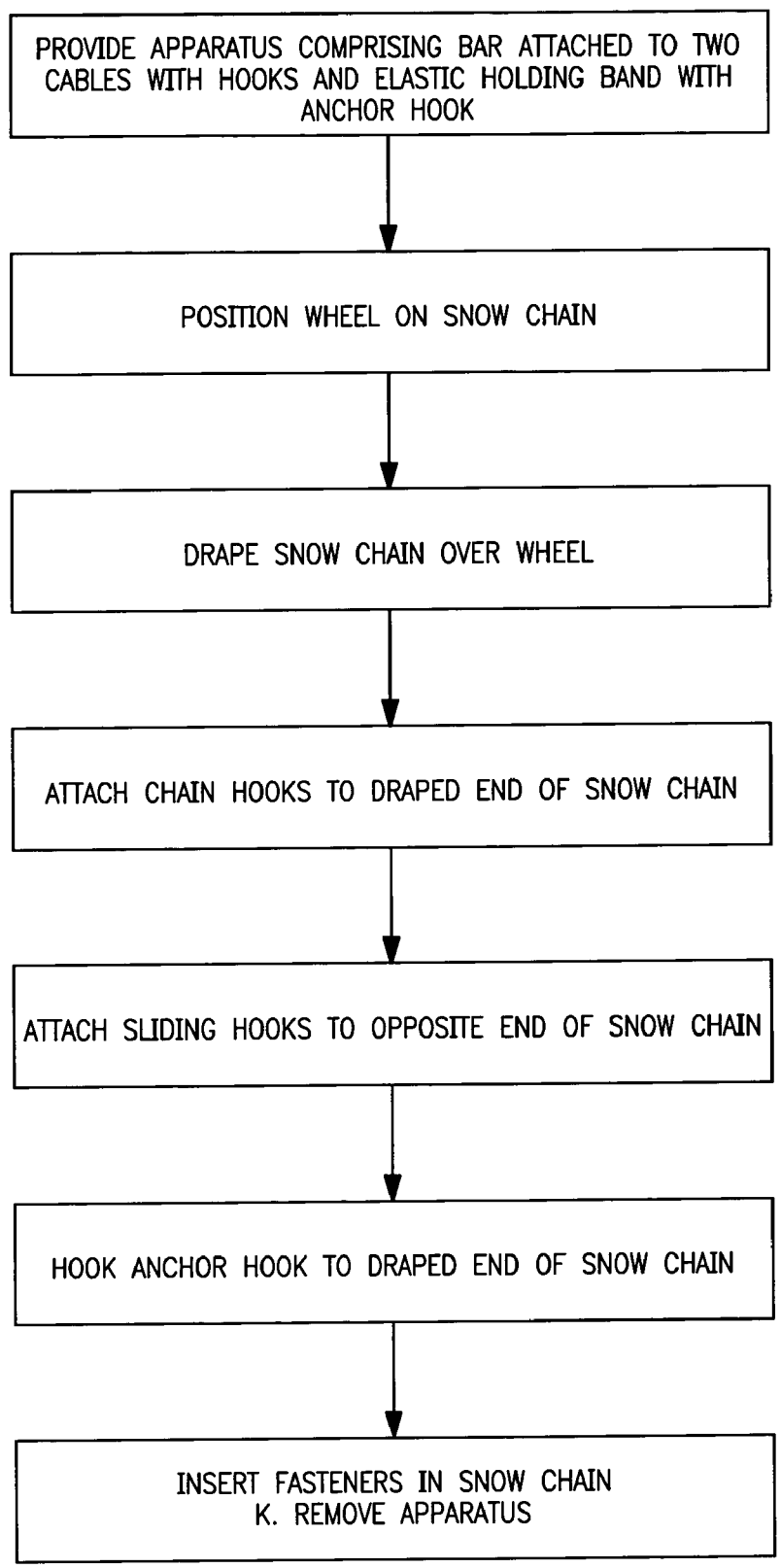
FIG. 2 is a flow chart of steps for practicing the method of this invention

Turning now to a discussion of the drawings, FIG. 2 is a perspective view showing the chain-mounting tool 10 of this invention.

There is shown a rigid bar 12 having a length a little longer than the width of an automobile tire.

A pair of cables 14A,B are shown, each cable 14A,B having one end attached to an end of the bar 12 opposite the other cable 14B.A attached to the other end of the bar 12. Another end of the cable 14 A,B is attached securely to a cable hook 16 A,B. A pair of sliding hooks 18A,B is provided. Each sliding hook 18A,B is slideably mounted on one cable 14 A,B respectively.

An elastic cable 20 has one end attached to the bar 12, midway between the ends of the bar 12.

Another hook 22 is attached to the free end of the elastic cable 20.

FIG. 2 is a flow chart listing steps for attaching the snow chain to the wheel.

Figure 1:
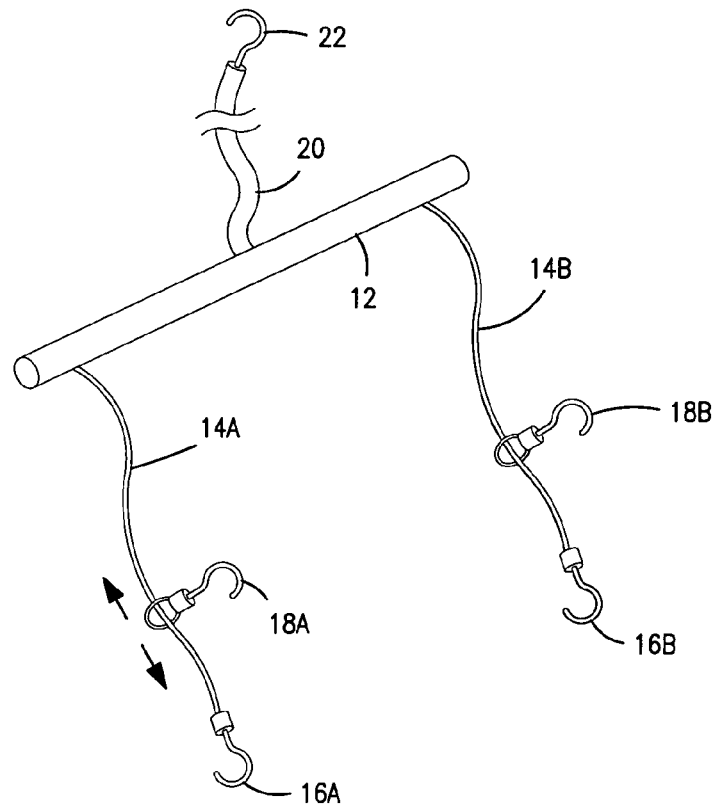
FIG. 1 shows the apparatus for practicing the method of this invention.
Figure 3:
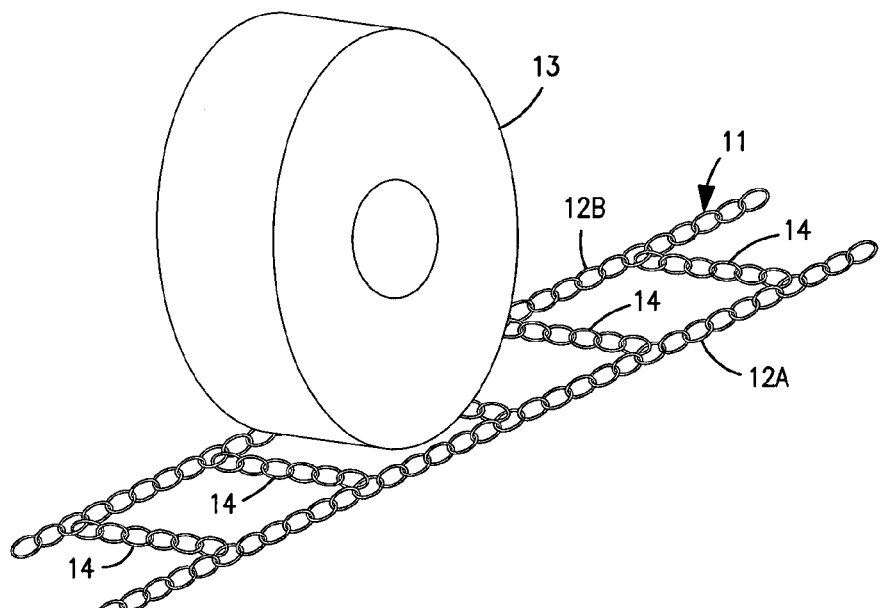
FIG. 3 shows a wheel positioned on a snow chain for mounting the snow chain on the wheel.

In step 1, the snow chain 11 is laid out in front of the wheel 13. As shown in FIG. 3. the vehicle is driven onto the snow chain 11 so that the wheel 13 is about twelve inches from a forward end of the snow chain 11.

Figure 4:
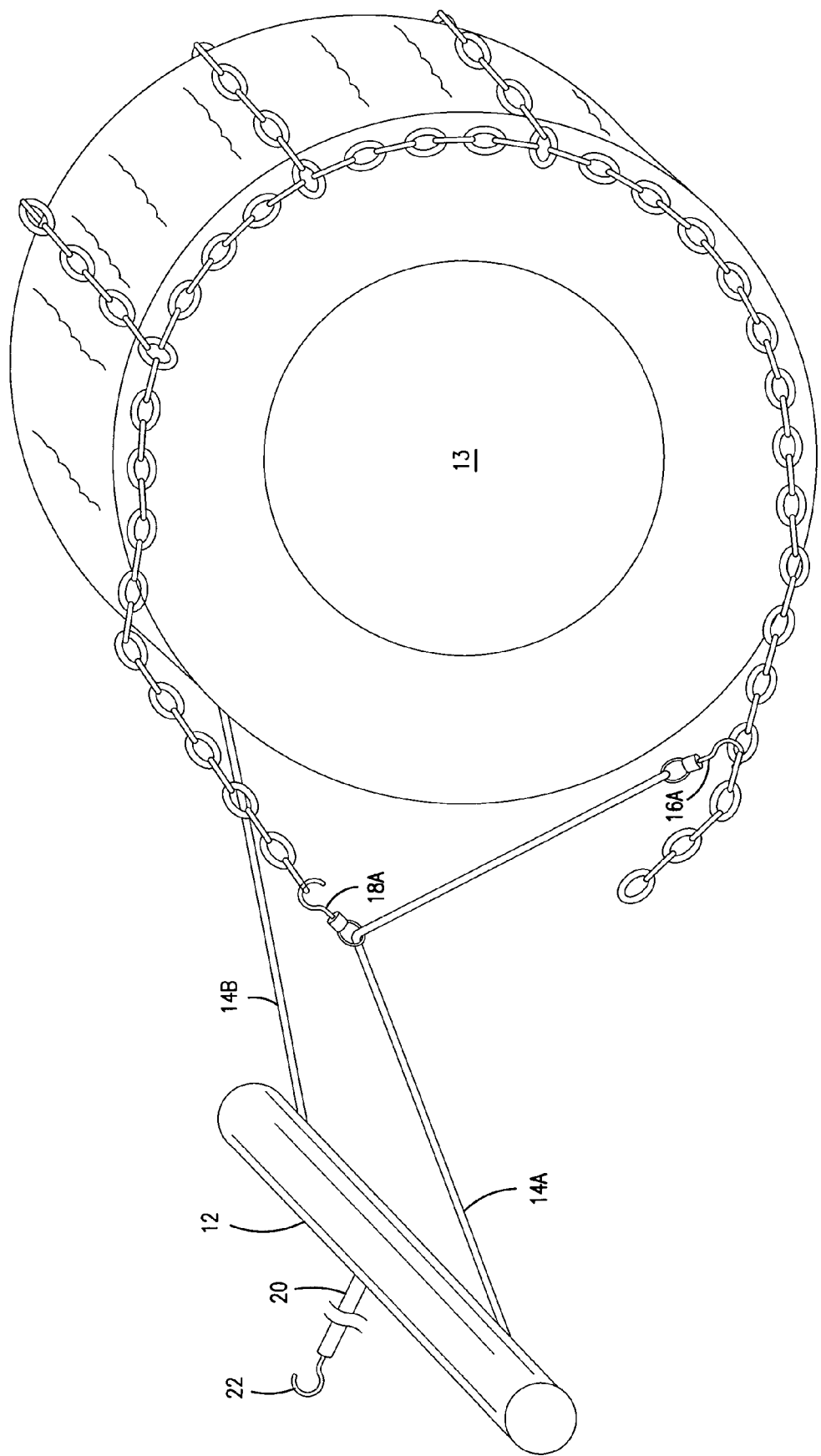
FIG. 4 shows the snow chain draped around the wheel.

In step 2, (FIG. 4) the forward end of the snow chain is draped around over the top of the wheel.

In step 3, (FIG. 4) each of the chain hooks 16A and 16B, are attached to the forward end of a respective one of the side chains 12A,B of the snow chain 11. Cable 14B is cutaway and side chain 12B is not shown in FIG. 4.

In step 4, (FIG. 4) each of the sliding hooks 18 A,B is hooked to the rearward end of the side chain. 12A,B, respectively, opposite the draped end The ends of the snow chain 11 are thereby drawn together around the wheel.

Figure 5:
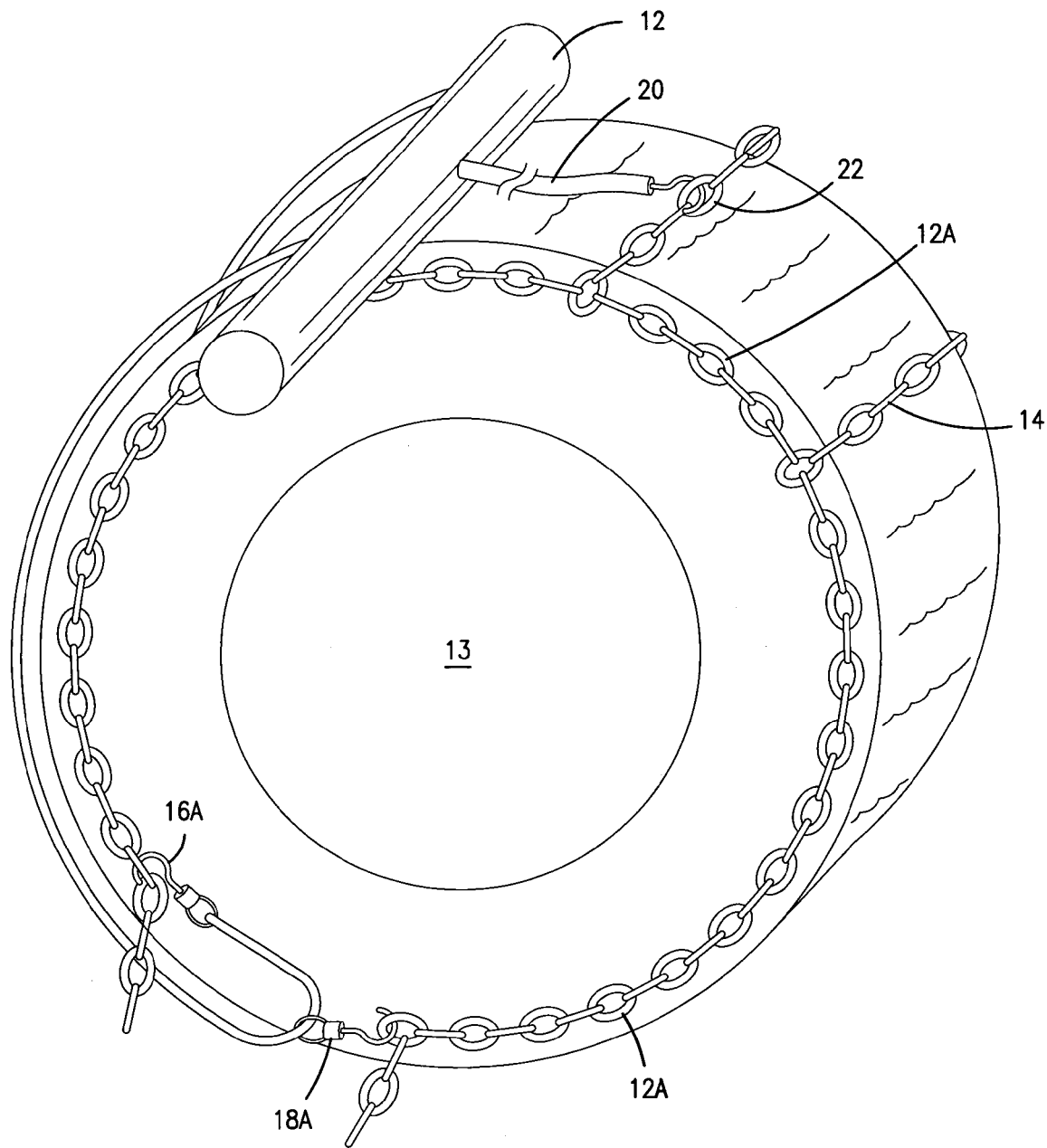
FIG. 5 shows attachment of the bar to secure the snow chain onto the wheel.

In step 5, (FIG. 5) the anchor hook 22 on the end of the elastic band 20 is hooked onto a linking chain 14 at the rearward end of the snow chain 11 so that the snow chain 11 is held in place around the wheel 13.

In step 6, a fastener is inserted into a link at each end of each side chain respectively and the apparatus 10 is unhooked from the snow chain.

There has been described a device that enables a driver to conveniently secure a snow chain onto a wheel of a vehicle.

Variations and modifications may be contemplated after reading the specification and studying the drawings that are within the scope of the invention. I therefore wish to define the scope of my invention by the appended claims.

I claim:

1. An apparatus for use in securing a snow chain onto the wheel of a vehicle, said snow chain including a pair of side chains (12), side by side and parallel to one another, a plurality of linking chains (14), each linking chain (14) having one end attached to one side chain (12) and another end attached to the other side chain (12) so that said snow chain (16) is a chain ladder, said apparatus comprising:
   a bar;
   a pair of cables, said one cable having one end secured to one end of said bar opposite said another cable having one end secured to an opposite end of said bar;
   a pair of chain hooks, one of said chain hooks secured on a free end of said one cable and another chain hook secured on a free end of said another cable;
   a pair of sliding hooks, said one sliding hook slideably mounted on one of said cables and said another sliding hook slideably mounted on said another one of said cables;
   an elastic band having one end secured to a location on said bar intermediate between ends of said bar;
   an anchor hook secured to another end of said elastic band enabling a user to lay said snow chain in front of said wheel, drive said vehicle onto the snow chain, drape said snow chain around and over a top of said wheel, attach each of said chain hooks to a draped end of a respective one of the side chains of the snow chain, hook said anchor hook on the elastic band to the opposite end of the snow chain providing that the ends of the snow chain are drawn together and said snow chain is drawn around the wheel, and permitting that inserting a fastener be inserted into links selected to join one end of each side chain to the opposite end of the same side chain.

2. A method for securing a snow chain onto the wheel of a vehicle, said snow chain including a pair of side chains (12), side by side and parallel to one another, a plurality of linking chains (14), each linking chain (14) having one end attached to one side chain (12) and another end attached to the other side chain (12) so that said snow chain (16) is a chain ladder, said method including steps:

A. providing an apparatus comprising:
   a bar;
   a pair of cables, said one cable having one end secured to one end of said bar opposite said another cable having one end secured to an opposite end of said bar;
   a pair of chain hooks, one of said chain hooks secured on a free end of said one cable and another chain hook secured on a free end of said another cable;
   a pair of sliding hooks, said one sliding hook slideably mounted on one of said cables and said another sliding hook slideably mounted on said another one of said cables;
   an elastic band having one end secured to a location on said bar intermediate between ends of said bar;
   an anchor hook secured to another end of said elastic band;
B. laying out the snow chain in front of the wheel;
C. driving the vehicle onto the snow chain to where the wheel is about twelve inches from a forward end of the snow chain;
D. draping the snow chain around over the top of the wheel;
E. attaching each of the chain hooks to a draped end of a respective one of the side chains of the snow chain;
F. sliding each sliding hook to a location on said respective cable intermediate between ends of said cable and hooking said sliding hook onto another end of said respective one of said side chain opposite said draped end whereby ends of the snow chain are drawn together and the snow chain is drawn around the wheel;
G. hooking the anchor hook on the elastic band onto a linking chain at the draped end of the snow chain whereby said snow chain is held in position on said wheel;
H. inserting a fastener through a link in one end of one side chain and through a link at an opposite end of said side chain; and
I. inserting another fastener through a link in one end of another side chain and through a link at an opposite end of said another side chain whereby said snow chain is secured around said wheel;
J. unhooking said apparatus from said snow chain secured on said wheel.

* * * * *